Patented Mar. 30, 1943

2,314,928

UNITED STATES PATENT OFFICE 2,314,928

PROMOTING RESTORATION OF TRANSPLANTED PLANTS

Albert C. Fischer, Chicago, Ill.

No Drawing. Application June 19, 1940,
Serial No. 341,381

2 Claims. (Cl. 47—58)

This invention relates to a method of provisionally projecting subjects of vegetation, such as plants, shrubs, trees, vines, etc., (all of which are understood to be included in the term "plant" as hereinafter used) from the ill effects of desiccation, for instance, during and immediately after their transplantation; and from the ill effects of malnutrition while they are becoming reestablished in the new environment to which they are transplanted, and from attack by insects and other parasites, their grubs and other larvae, at all times.

The invention also relates to subjects of vegetation per se, when clothed with the peculiar protecting sheath jacket or coating constructed thereon by the method of the present invention.

When a plant is separated from the earthy matrix in which it roots, particularly hair roots, have come into existence, these roots are deprived of the moisture, the presence of which in the capillaries of the plant, is essential to its continued living, and the plant becomes dormant. If dormant condition is not continued through too long a period, the plant may resume growth on replanting, providing the fine hair roots or feeder roots can resume moisture absorbing relation to the soil, but these fine hair roots or feeder roots do not immediately reenter into that intimacy of contact with the earth that is essential to a resumption of their absorption of moisture; hence, the problem with the plant is to remain alive while awaiting resumption of this function; a problem which the plant often fails to meet; especially at its extremities, if not throughout the entire plant structure. Moreover, separation of the root system of a plant from a soil environment in which it came into existence, disarranges the process of its food supply borne on available moisture, as a vehicle.

Furthermore, desiccation of the roots of a plant, arising through evaporation of contained moisture, and consequent contraction if not total collapse of its capillaries, adds greatly to the problem of the plant in staging a comeback when replanted.

Recognition of the foregoing phenomena largely discourages commercial activity involving transplantation of subjects of vegetation, or largely restricts such activities to the class of transplantation that involves retention around the root system of the so-called "ball" of earth to which the plant is native, as a means of saving the plant from the hazard of desiccation during the time required to effect transplantation. But retention of the "ball" around the root system of a large plant adds greatly to the expense of transferring the plant from its original to its new place of existence.

The present invention has for an object, the development, upon the root system of a plant, of a sheath comprising at least a jacket and preferably a composite sheath comprising the jacket and a surrounding coating of fertilizer as well; the said jacket being made of a material not banal to the tenderest roots, but having the characteristic of storing moisture within reach of the roots; this jacket portion of the sheath being developed by precipitation of the material from an evaporating watery solution thereof, sufficiently thin to intimately envelop and therefore bring moisture within reach of the finest rootlets as well as with the coarser roots; the feeder roots being thereby protected from drying out and choking the capillaries during the time of their dormant state, and for such length of time after reinterment as may be necessary to enable the roots to resume drawing upon the earth for moisture and nourishment; and a collateral condition in the preferred realization of this objective, residing in the use of a material (hygroscopic colloid) for the sheath, that will not only not obstruct transfer of nourishment from the surrounding earth or the coating of fertilizer immediately beyond the jacket, but will rather, promote such transfer even after reestablishment in the soil, by dissolving the plant food in and conveying it through means of the vehicular moisture which the jacket portion of the sheath maintains within it by its hygroscopic capacity.

Another object of the invention is to insure against the fertilizer part of the composite sheath, (hygroscopic jacket and fertilizer coating) surrounding the moisture bearing jacket coming into direct contact with the delicate roots of the system; in other words, prevents the reactive fertilizer from scorching the tender roots, while nevertheless leaving the fertilizer available to the roots by gradual solution of the fertilizer in the moisture of the jacket and its transfer within reach of the feeder roots, and provision for their sustenance, by the moisture of the jacket serving as a vehicle at least during the period of rehabilitation of the plant in its new environment, and as long thereafter as the plant may need it.

Still another object of the invention is to incorporate insect or other parasite-repelling constituents in the sheath, preferably as a further coating on the fertilizer, and applied around not only the root system, but portion of the plant stem as well, by the jacket substance, a sufficient distance to protect the stem against cut worm or other destructive influences that may be encountered by the plant above the surface of the ground.

The invention proceeds upon the principle of providing for the plant that is to be treated, a dip or spray comprising a solution of a hygroscopic material, the solution being much thinner than colloidal, say one that would result from a fraction of one percent of a colloid in any convenient volume of water, so that the fine hair roots or feeder roots will be thoroughly enveloped; any desired thickness of sheath being obtained by repeating the application of dipping or spraying treatment a number of times, with or without drying or partial drying after each application until a desired hygroscopic jacket has been built up, whereupon the jacket may be allowed to dry. The treatment may end with the development of this jacket and the hygroscopic colloid-forming material alone depended upon for drawing moisture from the atmosphere to the plant during transport or from the earth to the plant after transplanting is completed. Intimacy of envelopment of the feeder roots will result from the thinness of the original dip (or spray). The moisture bearing capacity will be determined by the thickness of the jacket developed by repetition of the application. This jacket alone, or the composite sheath, composed of colloidal jacket and surrounding coating of fertilizer, will, if it does not prevent withering, promptly revive the transplanted plant from a withered state. It is not necessary that all the dips or applications be made in very thin solution. Where the first one or two dips are of sufficiently high fluidity to insure thorough envelopment of fine roots, later dips may be of thicker solution, even as thick as a colloid, or jelly-like.

The invention contemplates using reversible colloid-forming substances for its hygroscopic jackets; or materials having the capacity to be sufficiently hygroscopic when dry to absorb water from the air or soil and establish, around the roots, and in intimate communication with the capillaries, a moist jelly-like jacket upon which the roots can draw for moisture.

When it is desired to use a non-drying colloid, or one which because of a glycerin constituent will remain moist and resist drying out of the roots, the coating may be brought to desired thickness by first putting on one or more thin, intimately enveloping solutions of a colloid-forming substance at a consistency however, that is far below that which is usually regarded as colloidal, and follow with one or more treatments with a colloidal solution containing glycerin. This will enable the roots to remain in reach of moisture while out of the ground.

As a formula that would answer the purpose of forming a hygroscopic or colloidal coating, but to which the invention is by no means limited, take for the first dip or first and second dips, say twenty-five hundredths (or one-quarter) of one percent, by weight, of any well known water-soluble colloid-forming substance, in a convenient volume of water and dip thereinto the roots of a plant promptly after it has been taken from the earth; let the water of this first coat evaporate until the coat will not be washed off by an ensuing dip. Then repeat the dipping in the thin solution and follow with a degree of drying that will cause the jacket to remain. Next, subject the roots of the plant to one, two or more dippings, in a solution of hygroscopic or colloid-forming material, with sufficient drying after each dip to avoid washing off the deposit by the solution that follows, until a desired thickness results. While this procedure is recited as productive of the best results, it is understood that the purposes of the invention may be realized to a measurably important degree by the employment of but a single initial dip in a solution thin enough to insure intimate envelopment, and a single after dip in a solution of colloidal or jelly-like consistency, or any other variation of the preferred procedure.

The hygroscopic coating will serve the plant during its dormant period involved in its transplantation. The character of fertilizer to be used is best left to the judgment of the nurseryman who supplies the plant to the market.

The colloids used are preferably reversible in the sense that even though they are permitted to dry out, their hygroscopic quality will persist to the degree of taking up moisture and resuming the moisture-bearing status that enables them to serve the purpose of the invention.

Among the commercially available substances that may be used in practicing that part of the invention that has to do with the collecting and transfer of moisture, may be mentioned hygroscopic materials; gluten; gelatin, vegetable or animal glue, plantago ovata, kelp, peat gelatinized by acids, etc., agar-agar; and colloids in general. Take for instance a one percent water solution of agar-agar as a dip bath for forming a thick coating upon the roots. This is preferably preceded by a dip in a thin water solution of a fraction of one percent of agar-agar. These being water soluble, may be compounded with various animal, vegetable or mineral insecticides; repellents of parasites, such as camphor, creosote, carbolic acid, etc., which may be applied as coatings upon the hygroscopic jackets. Fertilizers may be compounded with the jacketing dip, but are preferably applied as coatings upon the moisture storing jackets because in such practice the fine roots of the system are protected by the colloidal jacket, from injury by the strong fertilizer. Insecticides, and repellents of parasitic influences, are preferably applied upon the outside of the fertilizer coating.

This application constitutes a continuation-in-part of my application Serial No. 8,715, filed February 28, 1935, and entitled "Fertilizer, insecticide and seed distribution."

I claim:

1. In the art of protecting a plant during transplantation, the improvement which comprises coating at least the root system of the plant with a solution of a hygroscopic material, the consistency of which is sufficiently light to insure envelopment and intimate contact with the rootlets of said system and thereby establishing a moisture bearing coating upon said rootlets and increasing the thickness and moisture bearing capacity of said coating by an additional application thereto of a second coating of moisture carrying material in solution, the first coating of moisture bearing material being applied as a thin watery solution and the second coating being applied in the form of a solution of greater viscosity.

2. The method set forth in claim 1 wherein a soluble plant food is incorporated in the additional coating.

ALBERT C. FISCHER.